US006061681A

United States Patent [19]

Collins

[11] Patent Number: 6,061,681

[45] Date of Patent: *May 9, 2000

[54] ON-LINE DATING SERVICE FOR LOCATING AND MATCHING PEOPLE BASED ON USER-SELECTED SEARCH CRITERIA

[75] Inventor: Gregg E. Collins, Los Angeles, Calif.

[73] Assignee: Movo Media, Inc., Los Angeles, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/885,198

[22] Filed: Jun. 30, 1997

[51] Int. Cl.[7] .......... G06F 17/30

[52] U.S. Cl. .......... 707/5; 707/3; 707/4; 707/6; 707/102; 379/88.13

[58] Field of Search .......... 707/1–6, 9–10, 707/100–104, 200–201, 501, 513; 434/336, 350; 455/4.2; 379/93.09, 93.23, 88.13, 88.24, 220

[56] References Cited

U.S. PATENT DOCUMENTS

| | | | |
|---|---|---|---|
| Re. 30,579 | 4/1981 | Goldman et al. | 340/825.33 |
| Re. 30,580 | 4/1981 | Goldman et al. | 340/825.33 |
| D. 366,179 | 1/1996 | Hauser, II et al. | D7/307 |
| D. 366,803 | 2/1996 | Hauser, II et al. | D7/307 |
| D. 367,797 | 3/1996 | Hauser, II et al. | D7/307 |
| 3,904,955 | 9/1975 | Katz | 324/395 |
| 3,979,057 | 9/1976 | Katz et al. | 364/706 |
| 3,979,058 | 9/1976 | Katz et al. | 364/706 |
| 4,149,246 | 4/1979 | Goldman | 364/470.03 |
| 4,307,266 | 12/1981 | Messina | 379/88 |
| 4,427,848 | 1/1984 | Tsakanikas | 379/88 |
| 4,558,318 | 12/1985 | Katz et al. | 340/825.34 |
| 4,649,563 | 3/1987 | Riskin | 379/93.27 |
| 4,650,927 | 3/1987 | James | 379/93.18 |
| 4,651,150 | 3/1987 | Katz et al. | 340/825.34 |
| 4,677,659 | 6/1987 | Dargan | 379/93.27 |
| 4,737,980 | 4/1988 | Curtin et al. | 379/93.18 |
| 4,739,322 | 4/1988 | Katz et al. | 340/825.34 |
| 4,792,968 | 12/1988 | Katz | 379/92.03 |
| 4,816,824 | 3/1989 | Katz et al. | 340/825.36 |
| 4,817,129 | 3/1989 | Riskin | 379/88 |
| 4,845,739 | 7/1989 | Katz | 379/92.03 |
| 4,866,759 | 9/1989 | Riskin | 379/93.27 |
| 4,918,721 | 4/1990 | Hashimoto | 379/93.18 |

(List continued on next page.)

*Primary Examiner*—Anton W. Fetting
*Assistant Examiner*—Srirama Channavajjala
*Attorney, Agent, or Firm*—Stephen C. Glazier; Pillsbury Madison & Sutro LLP

[57] ABSTRACT

A computer-implemented system for matching people with each other includes a main computer server connectable to a network such as the Internet; a plurality of local servers connectable to the main computer server via a proprietary network, each of the local servers accessible via a telephone connected to a telephone network; and a database of user information distributed over the main computer server and the local servers. Each of the local servers and the main computer server has means for a particular user to update and read at least a portion of the database so as to match the particular user with at least one other user of the system. The main computer server provides means to update and read the database via a user computer connected to the Internet to access a server page. The local servers provide means to update and read the database via a telephone connected via the telephone network.

13 Claims, 6 Drawing Sheets

U.S. PATENT DOCUMENTS

| | | | |
|---|---|---|---|
| 4,930,150 | 5/1990 | Katz | 379/92.03 |
| 4,932,046 | 6/1990 | Katz et al. | 379/32 |
| 4,939,773 | 7/1990 | Katz | 379/204 |
| 4,975,945 | 12/1990 | Carbullido | 379/212 |
| 4,987,590 | 1/1991 | Katz | 379/204 |
| 5,014,298 | 5/1991 | Katz | 379/93.12 |
| 5,016,270 | 5/1991 | Katz | 379/92.03 |
| 5,031,206 | 7/1991 | Riskin | 379/93.27 |
| 5,048,075 | 9/1991 | Katz | 379/92.03 |
| 5,073,929 | 12/1991 | Katz | 379/93.12 |
| 5,091,933 | 2/1992 | Katz | 379/204 |
| 5,109,404 | 4/1992 | Katz et al. | 379/88 |
| 5,121,778 | 6/1992 | Baker et al. | 141/319 |
| 5,128,984 | 7/1992 | Katz | 379/92.03 |
| 5,185,787 | 2/1993 | Katz | 379/204 |
| 5,218,631 | 6/1993 | Katz | 463/41 |
| 5,222,530 | 6/1993 | Baker et al. | 141/18 |
| 5,222,531 | 6/1993 | Baker et al. | 141/18 |
| 5,224,153 | 6/1993 | Katz | 379/93.12 |
| 5,251,252 | 10/1993 | Katz | 379/92.03 |
| 5,255,309 | 10/1993 | Katz | 379/88 |
| 5,259,023 | 11/1993 | Katz | 379/88 |
| 5,278,397 | 1/1994 | Barkan et al. | 235/462 |
| 5,284,188 | 2/1994 | Baker et al. | 141/18 |
| 5,289,854 | 3/1994 | Baker et al. | 141/18 |
| 5,289,855 | 3/1994 | Baker et al. | 141/18 |
| 5,295,518 | 3/1994 | Baker et al. | 141/18 |
| 5,295,519 | 3/1994 | Baker et al. | 141/18 |
| 5,297,197 | 3/1994 | Katz | 379/204 |
| 5,332,892 | 7/1994 | Li et al. | 235/462 |
| 5,337,347 | 8/1994 | Halstead-Nussloch et al. | 379/67 |
| 5,339,358 | 8/1994 | Danish et al. | 379/368 |
| 5,349,633 | 9/1994 | Katz | 379/88 |
| 5,351,285 | 9/1994 | Katz | 379/93.14 |
| 5,352,922 | 10/1994 | Barkan et al. | 257/459 |
| 5,359,645 | 10/1994 | Katz | 379/93.12 |
| 5,365,575 | 11/1994 | Katz | 379/93.13 |
| 5,392,338 | 2/1995 | Danish et al. | 379/93.27 |
| 5,412,708 | 5/1995 | Katz | 348/14 |
| 5,421,008 | 5/1995 | Banning et al. | 707/4 |
| 5,442,688 | 8/1995 | Katz | 379/156 |
| 5,467,392 | 11/1995 | Norimatsu | 379/354 |
| 5,478,997 | 12/1995 | Bridgelall et al. | 235/462 |
| 5,495,284 | 2/1996 | Katz | 348/15 |
| 5,506,392 | 4/1996 | Barkan et al. | 235/472 |
| 5,548,634 | 8/1996 | Gahang et al. | 379/93.27 |
| 5,553,120 | 9/1996 | Katz | 379/88 |
| 5,561,707 | 10/1996 | Katz | 379/88 |
| 5,623,660 | 4/1997 | Josephson | 707/9 |
| 5,694,546 | 12/1997 | Reisman | 705/26 |
| 5,720,619 | 2/1998 | Fisslinger | 434/336 |
| 5,737,395 | 4/1998 | Irribarren | 379/88.13 |
| 5,754,938 | 5/1998 | Herz et al. | 455/4.2 |
| 5,764,736 | 6/1998 | Shachar et al. | 379/93.09 |
| 5,901,214 | 5/1999 | Shaffer et al. | 379/220 |

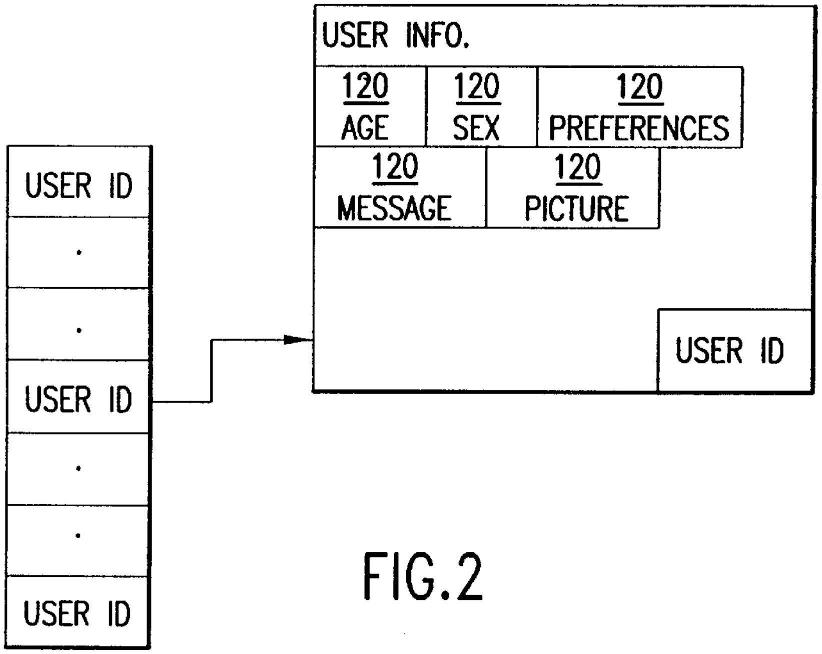

FIG.2

114

SUMMARY: YOU ASKED FOR WOMAN AGED 60-70 WHO LIVE IN FORT LAUDERDALE, FL AND WHO PLAY CANASTA. WE FOUND MORE THAN 2,000 MATCHES.

| | | | | | |
|---|---|---|---|---|---|
| USER ID | AGE | SEX | PREFERENCES | MESSAGE | PICTURE |
| USER ID | AGE | SEX | PREFERENCES | MESSAGE | PICTURE |
| USER ID | AGE | SEX | PREFERENCES | MESSAGE | PICTURE |
| USER ID | AGE | SEX | PREFERENCES | MESSAGE | PICTURE |
| USER ID | AGE | SEX | PREFERENCES | MESSAGE | PICTURE |

FOR MORE MATCHES CLICK HERE X

FIG.3

ON-LINE DATING SERVICE FOR LOCATING AND MATCHING PEOPLE BASED ON USER-SELECTED SEARCH CRITERIA

RELATED APPLICATIONS

This invention is related to co-pending U.S. patent application Ser. No. 08/885/199, assigned to Movo Media, Inc. now U.S. Pat. No. 5,963,951, titled “Computer-Implemented Searching and Matching of People Based on Personal Preference Criteria including Location” to Gregg Collins, filed concurrently herewith, the contents of which are hereby incorporated herein by reference.

BACKGROUND OF THE INVENTION

1. Reservation of Copyright

The disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

2. Field of the Invention

This invention relates to a system, method and interface for matching people with each other. More particularly, this invention relates to a computerimplemented method, system and interface thereto for matching people with each other according to desired characteristics.

3. Background

Matchmaking is an age-old art, made more and more necessary in this day and age by the demographic and cultural changes which make it difficult for likeminded people to meet. The social and family structures which help people meet each other are no longer available or acceptable to a large portion of society. Accordingly, it is desirable to have some sort of system which helps people meet each other.

There are systems which take some advantage of telephone technology to aid in this process. In these systems, a person wishing to meet another person must make a telephone call to a number and is then able to hear messages from others who are looking to meet people. In most of these prior systems, the user is able to select a category of people based only on gender preference. That is, a man looking to meet women makes one selection and listens to the appropriate messages, whereas a woman wanting to meet men would make a different selection to hear messages from men wanting to meet woman. Of course selections can also be made for men wanting to meet other men, women wanting woman and all sorts of other combinations.

However, in these prior art systems, once a person has made their gender preference selection, that person will have to listen to all appropriate messages. Most prior systems do provide the user with a way to skip or replay messages.

In most prior systems, each message comes from a particular person and has an identification, e.g., a box number, associated with it. Thus, in order for a user to contact the person who left a particular message, some systems provide users a way to reply to messages using the provided identification. For example, a system might say “This person is at box number 69, to leave a message for this person, press 69.” Other systems do not indicate the box number to the user, and message replies are sent by pressing a particular key. For example, such a system might say “To leave a message for this person, press 1.”

In general, prior art systems are little more than voice-mail systems with some additional control features added.

Proprietors of this type of system make money by either charging for subscription or by requiring parties to call the system using toll calls, e.g., from “900” numbers.

There are now some system which allow users to get some information about them from the World Wide Web (the Web). Typically these systems use the Web for advertising, and they do little more than direct users to a telephone system. While such a use make financial sense, it does not make good use of the power of the Web.

Summary of the Invention

It is desirable to provide users with a system which they can access using either a telephone or via a computer network such as the Internet.

It is also desirable to provide such a system in which the information is current, regardless of whether it is obtained via the Internet or a telephone system.

Accordingly, in one aspect, this invention provides a computerimplemented method, system and interface thereto for locating and matching people. The system of this invention can be accessed either by telephone or via the Internet. Information entered using the telephone system can be accessed using the Internet and vice versa. Preferably the information is current and consistent, regardless of which access method is used.

In another aspect, this invention provides a graphical user interface (GUI) to a system for matching people. The GUI enables users to easily and quickly obtain information about possible desirable matches based on various user-selected criteria.

Thus, this invention provides a computer-implemented system for matching people with each other includes a main computer server connectable to a network such as the Internet; a plurality of local servers connectable to the main computer server via a proprietary network, each of the local servers accessible via a telephone connected to a telephone network; and a database of user information distributed over the main computer server and the local servers. Each of the local servers and the main computer server has means for a particular user to update and read at least a portion of the database so as to match the particular user with at least one other user of the system. The main computer server provides means to update and read the database via a user computer connected to the Internet to access a server page. The local servers provide means to update and read the database via a telephone connected via the telephone network.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein:

FIG. 2 shows an internal data structure associating system users with user information; and FIGS. 3–6 show a typical display used in the GUI of the system.

DETAILED DESCRIPTION OF THE PRESENTLY PREFERRED EXEMPLARY EMBODIMENTS

Figure 1A:
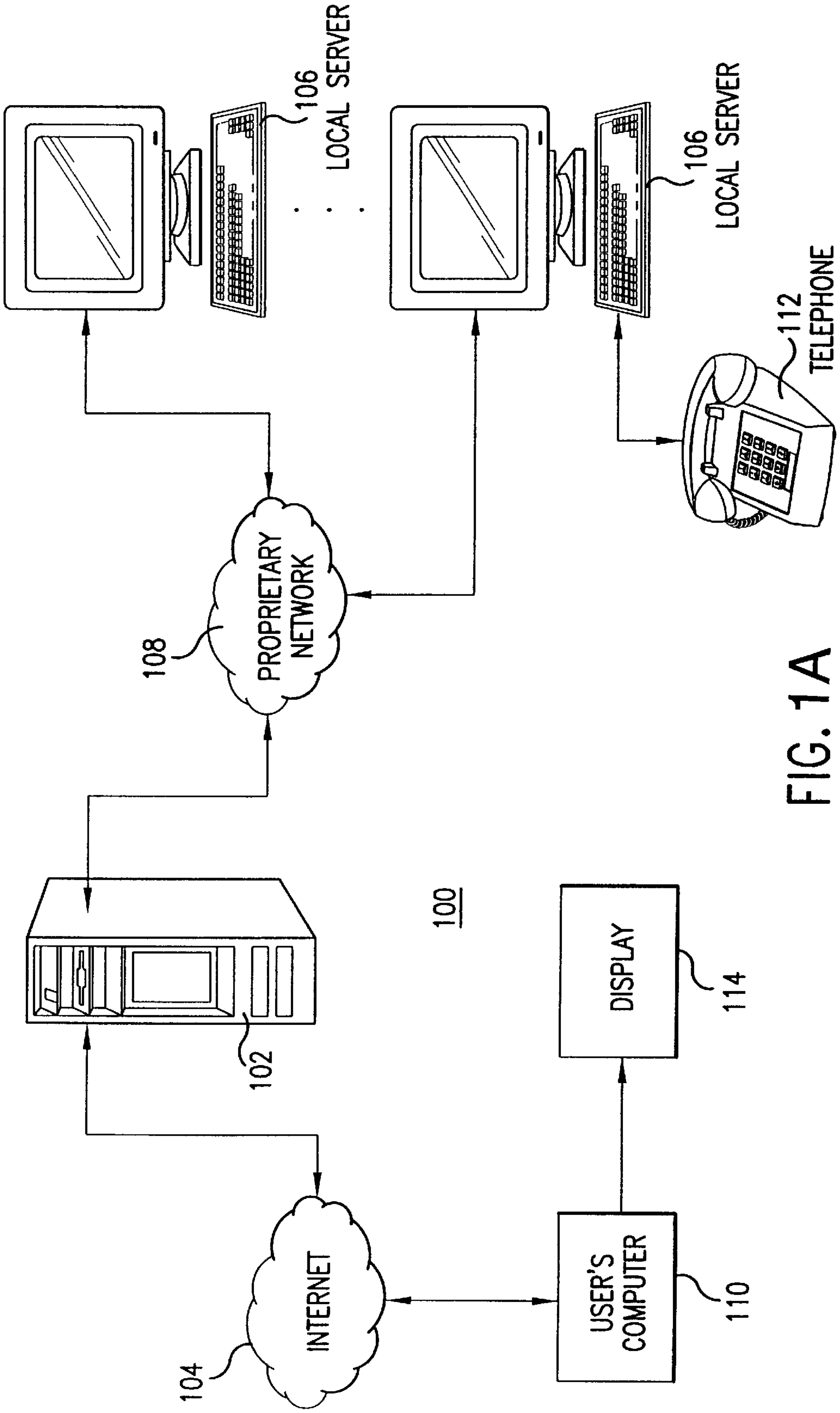
FIG. 1A shows an overview of the system.

The system 100 of this invention is now described with reference to FIG. 1A, wherein a Web server 102 is connected to a network such as the Internet 104. At various locations, preferably remote from that of the Web server 102, a number of local servers 106 connect to the Web server 102 via a proprietary network 108.

In a preferred embodiment, the Web server 102 runs the Windows NT operating system on a Pentium-based computer with an eight gigabyte hard disk and one hundred megabytes of random access memory (RAM). Each of the local servers 106 is a also a Windows NT-based computer system with thirty two megabytes of RAM.

The proprietary network 108 is a standard frame-relay network such as is operated by AT&T or MCI.

A user can access the system 100 either via the Internet 104 using a computer 110 (or some other form of accessing the Internet) or via a telephone 112, preferably a touch-tone phone, which accesses one of the local servers 106.

There are no special requirements for the user's computer 110, other than that it have some means of accessing the Internet 104.

Figure 1B:
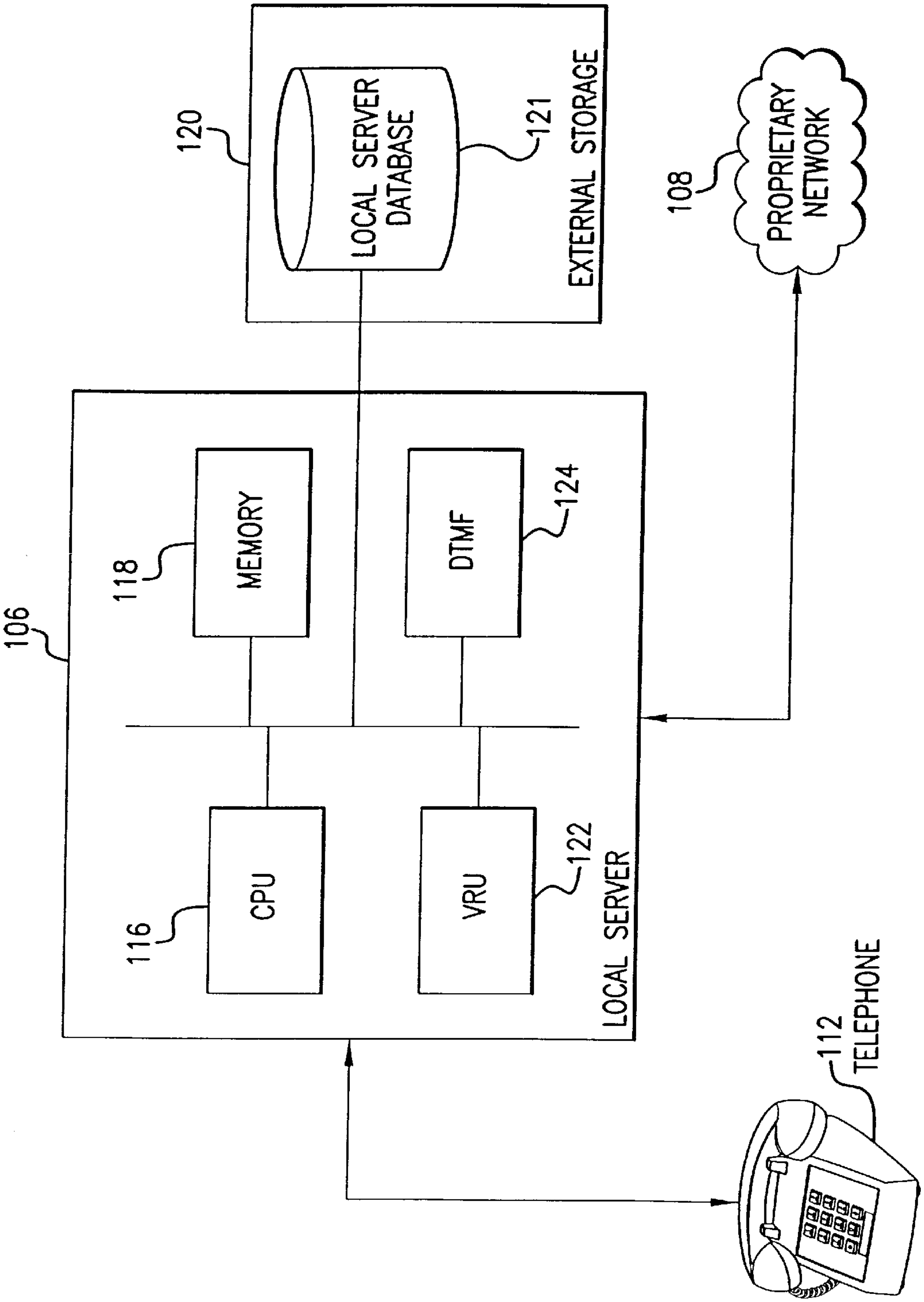
FIG. 1B provides a more detailed view of a a local server of the system of FIG. 1A.
Figure 4:
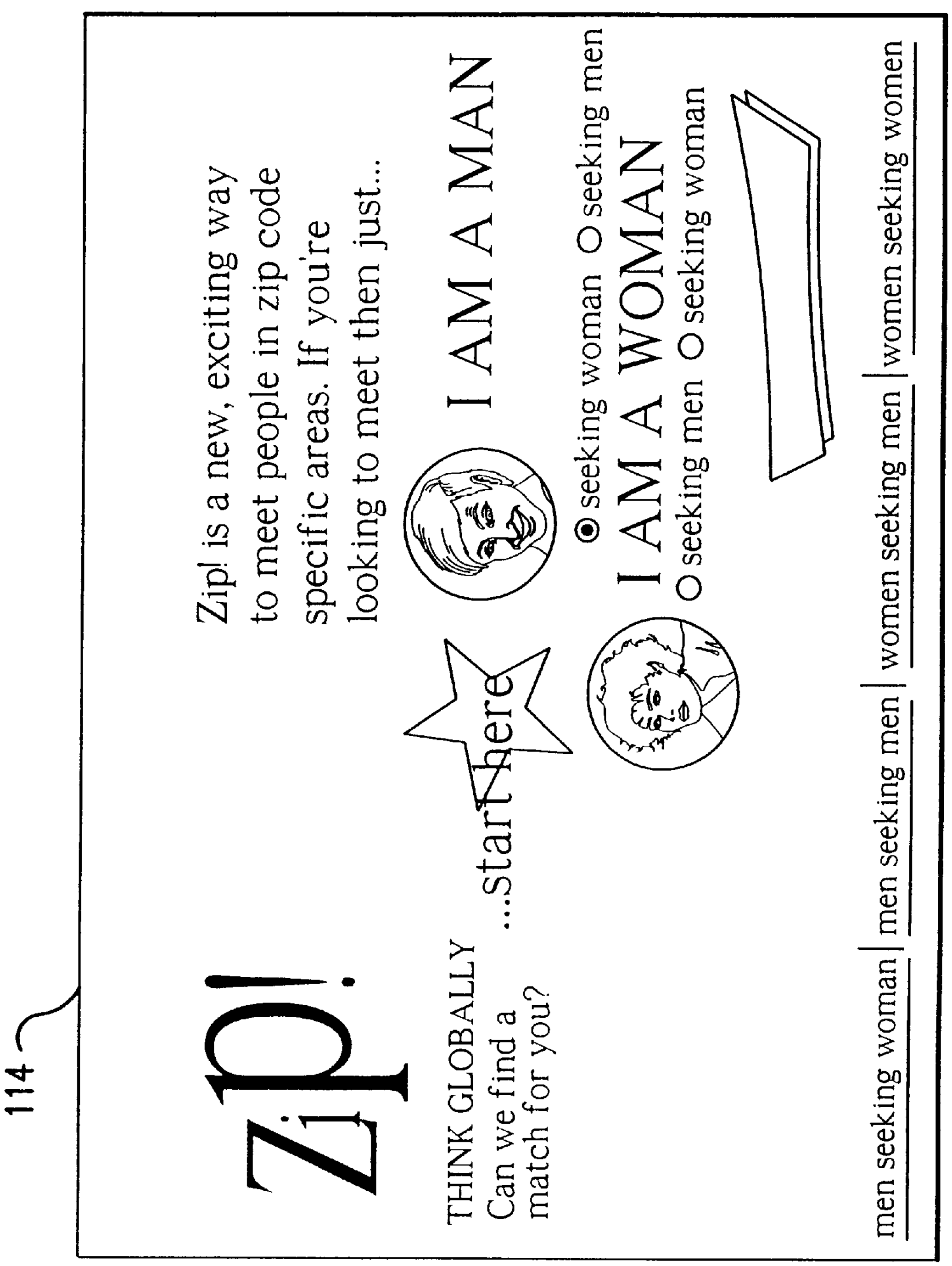
Figure 5:
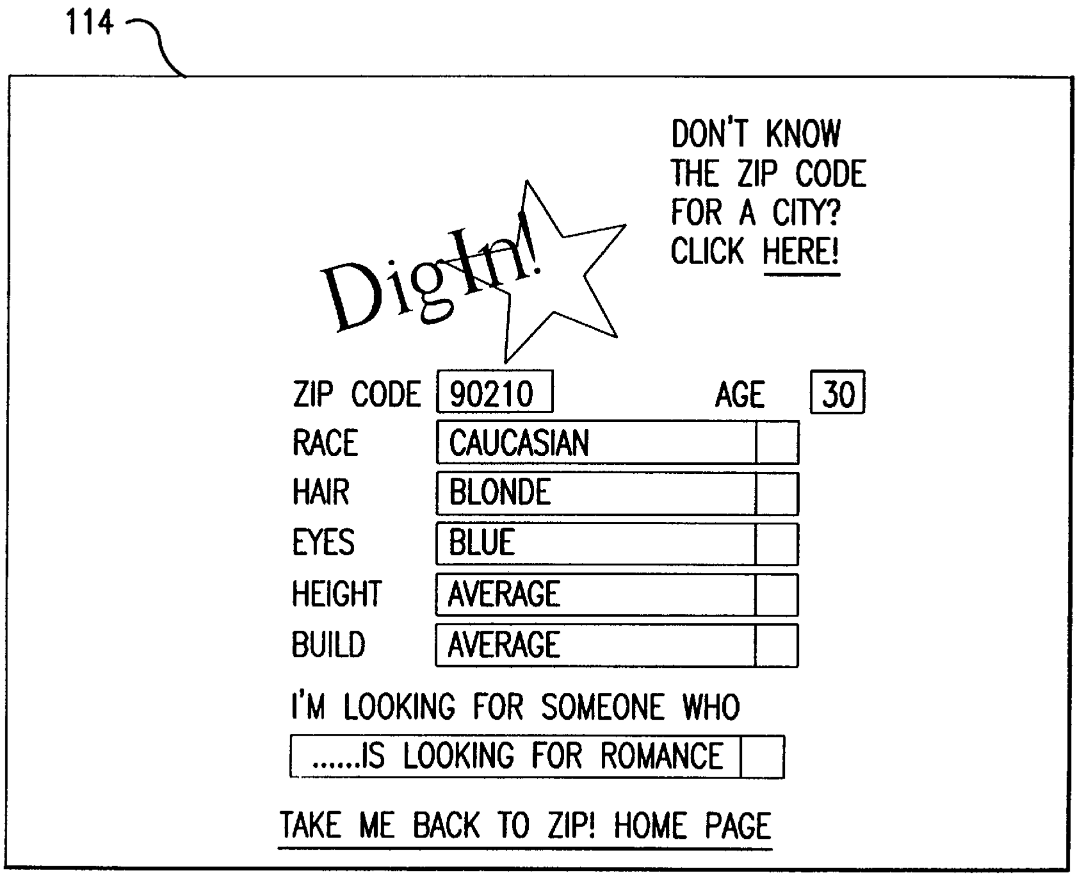

A more detailed view of a typical local server 106 is shown in FIG. 1B, wherein a local server 106 preferably includes a CPU 116, internal memory 118 and external storage 120. External storage 120 is preferably some storage device such as a hard disk drive or the like with a capacity, preferably of between 500 megabytes to 2 gigabytes. Each of the local servers 106 is also preferably a Windows NT-based computer system with thirty two megabytes of RAM as the internal memory 118. The local servers 106 are preferably at least as powerful as an Intel 386. That is, the CPU 116 is preferably at least an Intel 386.

A local server 106 preferably also includes a voice response unit (VRU) 122 for generating a voice response to a user's telephone 112. The VRU 122 directs an input from the server 106 to a user on a telephone 112. The user, communicating with the local server 106 through a telephone 112, enters input by depressing buttons on a telephone keypad. A DTMF receiver card 124 in the local server 106 receives DTMF tones from the telephone 112.

Operation of the System

The operation of the system 100 is now described with reference to FIGS. 1A-6.

A person accessing the system 100 via a telephone 112 calls the telephone number of a local server 106. Preferably the user will call the server 106 which is geographically local to that user. The reason for this is that, in preferred embodiments, the system 100 will search for matches for the user in the user's geographically local area. For instance, a user in Seattle will want to find someone in Seattle and will therefore call the Seattle local server 106.

When the system 100 is being accessed by telephone 112, the user enters information and the DTMF receiver card 124 receives the information from the user. The system 100 also collects information from the user. In the case of telephone access to the system, this information is obtained, for example, by asking the user to press various keys on the telephone keypad to indicate answers to questions asked through the VRU 122. In the case of access via the network 104, the user's information is entered using any known manner using a typical browser application.

When the information is obtained over the telephone, the server 106 requests the information from the user by asking the user questions through the VRU 122. The questions include, for example, "Press 1 if you are a man", "Press 2 if you are a woman", "Press 1 if you are seeking a man", "Press 2 if you are seeking a woman", "Spell your first name using the buttons on your telephone keypad corresponding to the appropriate letters, press 7 for Q and 9 for Z", and the like. When the information is obtained via a user computer 110 over a network 104 such as the Internet, the user is presented with display screen forms and data is entered via the user's browser running on computer 110.

In the case of a user accessing the system by telephone 122, search results are announced to the user via the VRU 122, otherwise they are presented to the user on the display monitor 114 of his computer 110.

In order to use some aspects of the system 100, users must subscribe to the system. The subscription process involves the system 100 ascertaining information about the user. The user information is essentially in two parts, some of the information is to be used by a searching algorithm to help the system 100 find a match for the user, while the other information is really used to help others determine if the user is a match for them. Accordingly, some of the information is descriptive and biographical, such as, e.g., age, height, eye color, whereas other information relates to the user's preferences, e.g., gender preferences, age preferences, religion preferences and the like. Generally, any acceptable aspects of the user which can be used to refine a search algorithm are obtained as the user information.

Subscribers are also given an option to record a message which will be played to other users.

Once a user subscribes to the system 100, the user is provided with a system identification, preferably a unique number. Then, as shown in FIG. 2, this system identification is then also given an internal association with the user's information.

When a person calls their local server 106, they are given various options, including subscribing, changing their subscription options, and listening to messages from other subscribers. While listening to messages from other subscribers, a user can choose to reply to a message.

In some embodiments, when listening to messages from other subscribers, a user can request more information about the message sender. When such a request is made, the local server 106 which the user called retrieves the appropriate user information from its database and provides the user who called more details about the message sender. For example, if a user likes the sound of a particular message and is considering replying to that message, he can request more information about the sender. When he does so, the local server 106 retrieves the information about that user and provides it over the telephone, preferably in a realistic sounding voice.

In preferred embodiments, all initial messages left by subscribers (that is, all messages which are intended for all others to hear) are pre-screened before being added to the list of available messages. To do this pre-screening, whenever a user subscribes (or modifies their user information), the message that they record as a part of their user information is sent via the network 108 to a central location, preferably the same location as that of the Web server 102, where the messages are screened by administrative personnel. If the messages are unacceptable then they are removed from the system.

All acceptable messages are then converted into a format which requires as little space as possible and which allows them to be played on computers connected to the Internet 104. In preferred embodiments, each local server 106 includes a Dialogic VOX recorder and the messages are recorded at the local servers 106 using Dialogic VOX format. The messages are transferred from the local servers 106 to the Web Server 102 in VOX format and then, after screening, are converted to WAV format.

In some embodiments, the user database for each local server 106 is replicated at the Web server 102.

In order to access the system 100 via the Internet 104, the user must access the Internet in some known, standard manner such as via computer 110 or with any other means of accessing the Internet. As described herein, a Web connection using a computer 110 is described, although other access methods are contemplated. Thus, using some standard Internet browser application such as Netscape (Trademark), the user brings up the system's home page (a Web page written in HTML or some such language). The system's home page is thus presented to the user on the display 114 of the computer 110.

From the system's home page (see FIG. 4), the user can, as with the phone system described above, either subscribe to or access the system 100. If the user chooses to subscribe to the system, the user is presented with a screen with various questions which, some of which should be answered (see FIG. 5). These questions correspond to the user preference, biographical and preference information which the system 100 must obtain from the user in order to perform searches etc.

Preferably the user's computer 110 also has some mechanism for recording and sound so that the user can set up a complete subscription. If the user cannot record sound using their computer, the user is provided with a temporary user identifier and the user can add their sound (voice) message using the local telephone access system.

In some embodiments, a subscribing user can also provide a digitized picture as part of their subscription. As with voice messages, pictures are preferably screened for content.

Since telephone users preferably access the system 100 via their geographically local server 106, a subscriber via the Internet is required to select their geographic location. Based on this location, the subscriber information is sent from the Web server 102 to the appropriate local server 106 where it is stored in that local server's user database.

Figure 6:
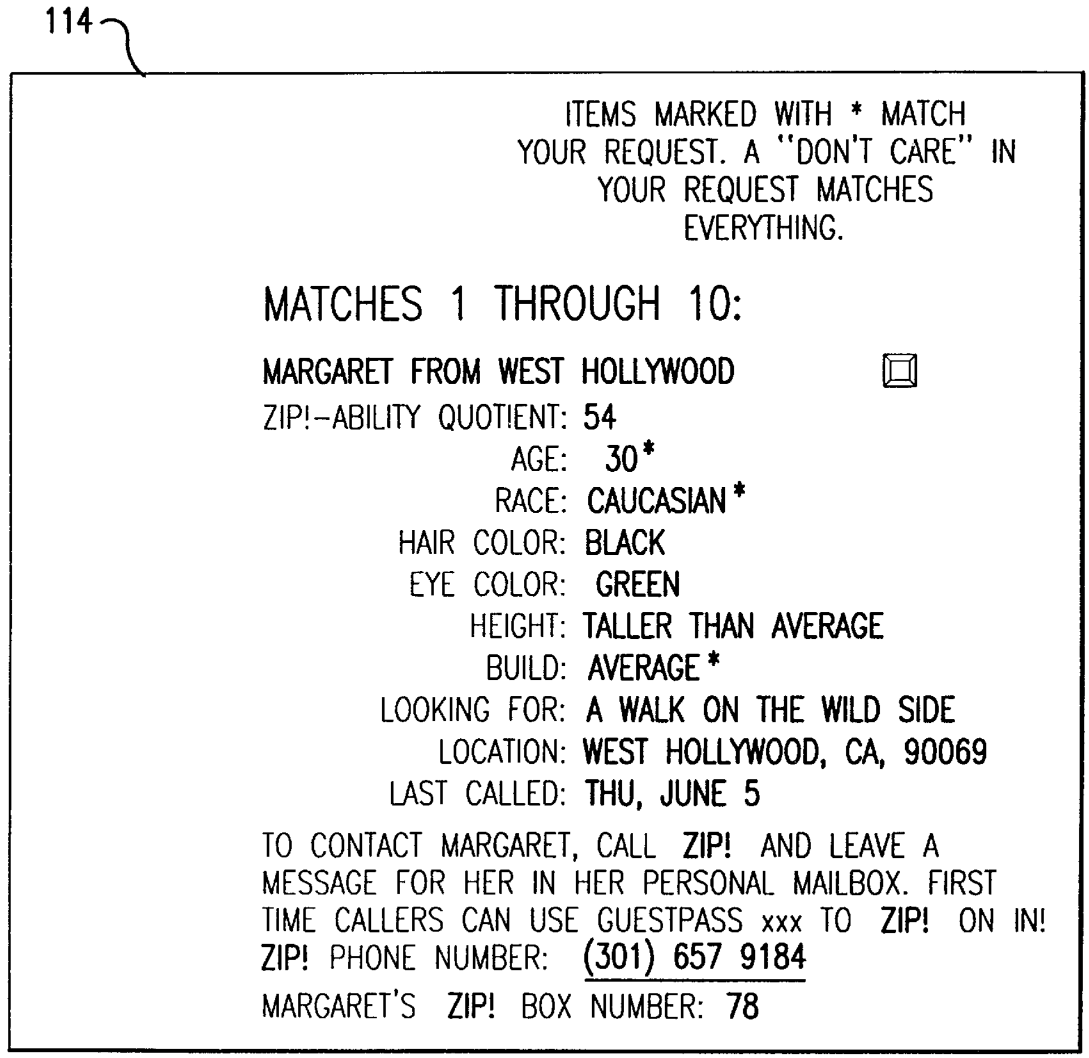

Analogous to listening to appropriate messages via the telephone access to the system 100, a user with a Web browser can access messages by entering various search criteria at a Web page. The user then requests a search based on the selected criteria and is provided with a list of matching people. The list is presented on the display screen 114 of the computer 110 in a manner such as shown in FIG. 3 or as individual search results as shown in FIG. 6.

First, the system 100 provides a summary of the search that was used along with a summary of the results. For example, the system might say "You asked for women aged 60–65 living in the 33301 zip code (Fort Lauderdale, Fla.) with gray hair who like to play canasta. We found more than 2,000 matches." Then the system would list the matches, one-by-one, in groups of ten or twenty.

Each match is numbered, has the match's name and some biographical information taken from the user database. The matched person's message (recorded when they subscribed to the system or when they modified their message) can be played by on the user's computer 110 by selecting (with a mouse or some other known means) an icon on the screen next to the current list entry. Similarly, the matched person's picture, if one exists in the system, can be viewed by selecting an icon associated with the current list entry.

In this manner, a user can get a list of appropriate people (i.e., people who meet her criteria and whose criteria she meets) and then browse the list to get information about the people. The available information can include sound recordings and pictures.

The preferred search algorithm for this invention is described in co-pending U.S. patent application Ser. No. 08/882,199, now U.S. Pat. No. 5,963,951 to be assigned, titled "Computer-Implemented Searching and Matching of People Based on Personal Preference Criteria including Location" to Gregg Collins, filed concurrently herewith, the contents of which have been fully incorporated herein by reference.

If the user wishes to contact one of the matching people, the user is provided with an identifier for that person and can leave a message for that person, either via the browser or using the telephone system. Depending on the billing policy of the system 100, the user may have to leave the message via a toll ("900") number.

Although described with reference to a particular system and implementation, the computer aspects of the present invention can be implemented in software, hardware or any combination thereof. When implemented fully or partially in software, the invention can reside, permanently or temporarily, on any memory or storage medium, including but not limited to a RAM, a ROM, a disk, an ASIC, a PROM and the like.

Thus, a computer-implemented method, system and interface thereto for locating and matching people are provided. One skilled in the art will appreciate that the present invention can be practiced by other than the described embodiments, which are presented for purposes of illustration and not limitation, and the present invention is limited only by the claims that follow.

I claim:

1. A computer-implemented system for matching people with each other, the system comprising:

a) a main computer server connectable to the Internet;

b) a plurality of local servers connectable to the main computer server via a proprietary network, each of the local servers accessible via a telephone connected to a telephone network; and c) a database of user information distributed over the main computer server and the local servers, wherein each of the local servers and the main computer server comprises: means for a particular user to update and read at least a portion of the database so as to match the particular user with at least one other user of the system, wherein the main computer server provides means to update and read the database via a user computer connected to the Internet to access a server page; and wherein the local servers provide means to update and read the database via a telephone connected via the telephone network, said means to update and read the database via a telephone comprising means for generating a voice response to the telephone and means for receiving DTMF tones from the telephone, said system implementing, in an on-line dating service, a method of searching a database of subscriber information in order to find at least one subscriber matching user search criteria, the subscriber information including preferences of subscribers to the service, wherein the users access the database by at least one of a telephone and a computer, wherein the subscriber information includes a date of last payment of a use fee by each subscriber and a date of last updating of a personal profile by each subscriber, the method comprising, by computer:

(A) repeatedly (a) searching the database for records matching search criteria of a user, and (b) relaxing at least some of the search criteria, until at least a required number of matching records are found, wherein the required number of matching records is never less than one;

(B) reporting the matching records to the user, including (a) reporting a degree of match for each reported record; and (b) indicating, for each reported record, a degree of match of each of the search criteria, (C) reordering the matching entries according to at least one of:

(a) a date of last payment of a use fee by each subscriber and (b) a date of last updating of a personal profile by each subscriber, wherein when the entries are reordered according to the date of last payment, the matching entries having a more recent date of the last payment are reported before others of the matching entries; and when the entries are reordered according to the date of last updating, the matching entries having a more recent data of last updating are reported before others of the matching entries, and wherein the search criteria include at least one of: a gender preference; a geographic location preference; an age preference; appearance preferences; religious belief preferences; educational level preferences; and a goal preference; and wherein the goal preference is one of "romance"; "friendship" or "a walk on the wild side"; and wherein the geographic location preference is at least one of: a postal code, a country a city, a suburb, a block, or a street; and wherein the gender preference search criterion is never relaxed, and wherein the geographic location preference search criterion is only relaxed after other search criteria have been relaxed.

2. A system as in claim 1 wherein the means for generating a voice response to the telephone comprises a voice response unit (VRU); and the means for receiving DTMF tones from the telephone comprises a DTMF receiver card.

3. A computer-implemented system for matching people with each other, the system comprising:

a main computer server connectable to a computer network;

a plurality of local servers connectable to the main computer server via a proprietary network, each of the local servers accessible via a telephone connected to a telephone network; and a database of user information distributed over the main computer server and the local servers, wherein each of the local servers and the main computer server comprises:

means for a particular user to access at least a portion of the database so as to match the particular user with at least one other user of the system, wherein the local servers provide means to access the database via a telephone connected via the telephone network, said means to access the database comprising means for generating a voice response to the telephone and means for receiving DTMF tones from the telephone, said system implementing, in an on-line dating service, a method of searching a database of subscriber information in order to find at least one subscriber matching user search criteria, the subscriber information including preferences of subscribers to the service, wherein the users access the database by at least one of a telephone and a computer, wherein the subscriber information includes a date of last payment of a use fee by each subscriber and a date of last updating of a personal profile by each subscriber, the method comprising, by computer:

(A) repeatedly (a) searching the database for records matching search criteria of a user, and (b) relaxing at least some of the search criteria, until at least a required number of matching records are found, wherein the required number of matching records is never less than one;

(B) reporting the matching records to the user, including (a) reporting a degree of match for each reported record; and (b) indicating, for each reported record, a degree of match of each of the search criteria, (C) a reordering the matching entries according to at least one of:

(a) a date of last payment of a use fee by each subscriber and (b) date of last updating of a personal profile by each subscriber, wherein when the entries are reordered according to the date of last payment, the matching entries having a more recent date of the last payment are reported before others of the matching entries; and when the entries are reordered according to the date of last updating, the matching entries having a more recent data of last updating are reported before others of the matching entries, and wherein the search criteria include at least one of: a gender preference; a geographic location preference; an age preference; appearance preferences; religious belief preferences; educational level preferences; and a goal preference; and wherein the goal preference is one of "romance"; "friendship" or "a walk on the wild side"; and wherein the geographic location preference is at least one of: a postal code, a country, a city, a suburb, a block, or a street; and wherein the gender preference search criterion is never relaxed, and wherein the geographic location preference search criterion is only relaxed after other search criteria have been relaxed.

4. A system as in claim 3 wherein the wherein the main computer server provides means to access the database via a user computer connected to the computer network.

5. A system as in claim 4 wherein the various means to access the database comprises:

means to update entries in the database; and means to read entries in the database.

6. A system as in claim 4 wherein the computer network is the Internet and wherein the means to access the database comprises a page accessible via the Internet.

7. A system as in claim 6 wherein the wherein the means to access the database comprises:

means for a user to provide the system with various search criteria; and means for the system to present to the user the results of a search of the database based on the various search criteria provided by the user.

8. A system as in claim 7 wherein the means to access the database further comprises:

means for selecting a result from the results of a search presented by the means for presenting, and means for obtaining more information about the selected result.

9. A system as in claim 8 wherein the more information includes at least one of: a sound recording and a picture.

10. A graphical user interface for accessing a computer-implemented people-matching system via a computer connected to a computer network, the system comprising a main computer server connectable to the computer network; a plurality of local servers connectable to the main computer server via a proprietary network, each of the local servers accessible via a telephone connected to a telephone network; and a database of user information distributed over the main computer server and the local servers, wherein each of the local servers provides means to access the database via a telephone connected via the telephone network, said means to access the database comprising means for generating a voice response to the telephone and means for receiving DTMF tones from the telephone, the interface comprising:

means for providing search criteria to the system;

means for displaying results of a search conducted on a database according to the provided search criteria;

means for selecting a particular result from the displayed results and for obtaining further information about the particular result, said system implementing in an on-line dating service, a method of searching a database of subscriber information in order to find at least one subscriber matching user search criteria, the subscriber information including preferences of subscribers to the service, wherein the users access the database by at least one of a telephone and a computer, wherein the subscriber information includes a date of last payment of a use fee by each subscriber and a date of last updating of a personal profile by each subscriber, the method comprising, by computer:

(A) repeatedly (a) searching the database for records matching search criteria of a user, and (b) relaxing at least some of the search criteria, until at least a required number of matching records are found, wherein the required number of matching records is never less than one;

(B) reporting the matching records to the user, including (a) reporting a degree of match for each reported record; and (b) indicating, for each reported record, a degree of match of each of the search criteria, (C) reordering the matching entries according to at least one of:

(a) a date of last payment of a use fee by each subscriber and (b) date of last updating of a personal profile by each subscriber, wherein when the entries are reordered according to the date of last payment, the matching entries having a more recent date of the last payment are reported before others of the matching entries; and when the entries are reordered according to the date of last updating, the matching entries having a more recent data of last updating are reported before others of the matching entries, and wherein the search criteria include at least one of: a gender preference; a geographic location preference; an age preference; appearance preferences; religious belief preferences; educational level preferences; and a goal preference; and wherein the goal preference is one of "romance"; "friendship" or "a walk on the wild side"; and wherein the geographic location preference is at least one of; a postal code, a country, a city, a suburb, a block, or a street; and wherein the gender preference search criterion is never relaxed, and wherein the geographic location preference search criterion is only relaxed after other search criteria have been relaxed.

11. A computer-implemented system for matching people with each other, the system comprising:

(a) a main computer server connectable to the Internet;

(b) a plurality of local servers connectable to the main computer server via a proprietary network, each of the local servers accessible via a telephone connected to a telephone network; and (c) a database of user information distributed over the main computer server and the local servers, wherein each of the local servers and the main computer server comprises: means for a particular user to update and read at least a portion of the database so as to match the particular user with at least one other user of the system, wherein the main computer server provides means to update and read the database via a user computer connected to the Internet to access a server page; and wherein the local servers provide means to update and read the database via a telephone connected via the telephone network, said means to update and read the database via a telephone comprising means for generating a voice response to the telephone and means for receiving DTMF tones from the telephone, said system implementing, in an on-line dating service, a method of searching a database of subscriber information in order to find at least one subscriber matching user search criteria, the subscriber information including preferences of subscribers to the service, the method comprising, by computer:

repeatedly (a) searching the database for records matching search criteria of a user, and (b) relaxing at least some of the search criteria, until at least a required number of matching records are found.

12. A computer-implemented system for matching people with each other, the system comprising:

a main computer server connectable to a computer network;

a plurality of local servers connectable to the main computer server via a proprietary network, each of the local servers accessible via a telephone connected to a telephone network; and a database of user information distributed over the main computer server and the local servers, wherein each of the local servers and the main computer server comprises:

means for a particular user to access at least a portion of the database so as to match the particular user with at least one other user of the system, wherein the local servers provide means to access the database via a telephone connected via the telephone network, said means to access the database comprising means for generating a voice response to the telephone and means for receiving DTMF tones from the telephone, said system implementing, in an on-line dating service, a method of searching a database of subscriber information in order to find at least one subscriber matching user search criteria, the subscriber information including preferences of subscribers to the service, the method comprising, by computer:

repeatedly (a) searching the database for records matching search criteria of a user, and (b) relaxing at least some of the search criteria, until at least a required number of matching records are found.

13. A graphical user interface for accessing a computer-implemented people-matching system via a computer connected to a computer network, the system comprising a main computer server connectable to the computer network; a plurality of local servers connectable to the main computer server via a proprietary network, each of the local servers accessible via a telephone connected to a telephone network; and a database of user information distributed over the main computer server and the local servers, wherein each of the local servers provides means to access the database via a telephone connected via the telephone network, said means to access the database comprising means for generating a voice response to the telephone and means for receiving DTMF tones from the telephone, the interface comprising:

means for providing search criteria to the system;

means for displaying results of a search conducted on a database according to the provided search criteria;

means for selecting a particular result from the displayed results and for obtaining further information about the particular result, said system implementing, in an on-line dating service, a method of searching a database of subscriber information in order to find at least one subscriber matching user search criteria, the subscriber information including preferences of subscribers to the service, the method comprising, by computer:

repeatedly (a) searching the database for records matching search criteria of a user, and (b) relaxing at least some of the search criteria, until at least a required number of matching records are found.

* * * * *